Oct. 20, 1953 E. A. HUNTER ET AL 2,656,321
METHOD FOR MAKING ALUMINA HYDROSOLS
Filed March 6, 1951
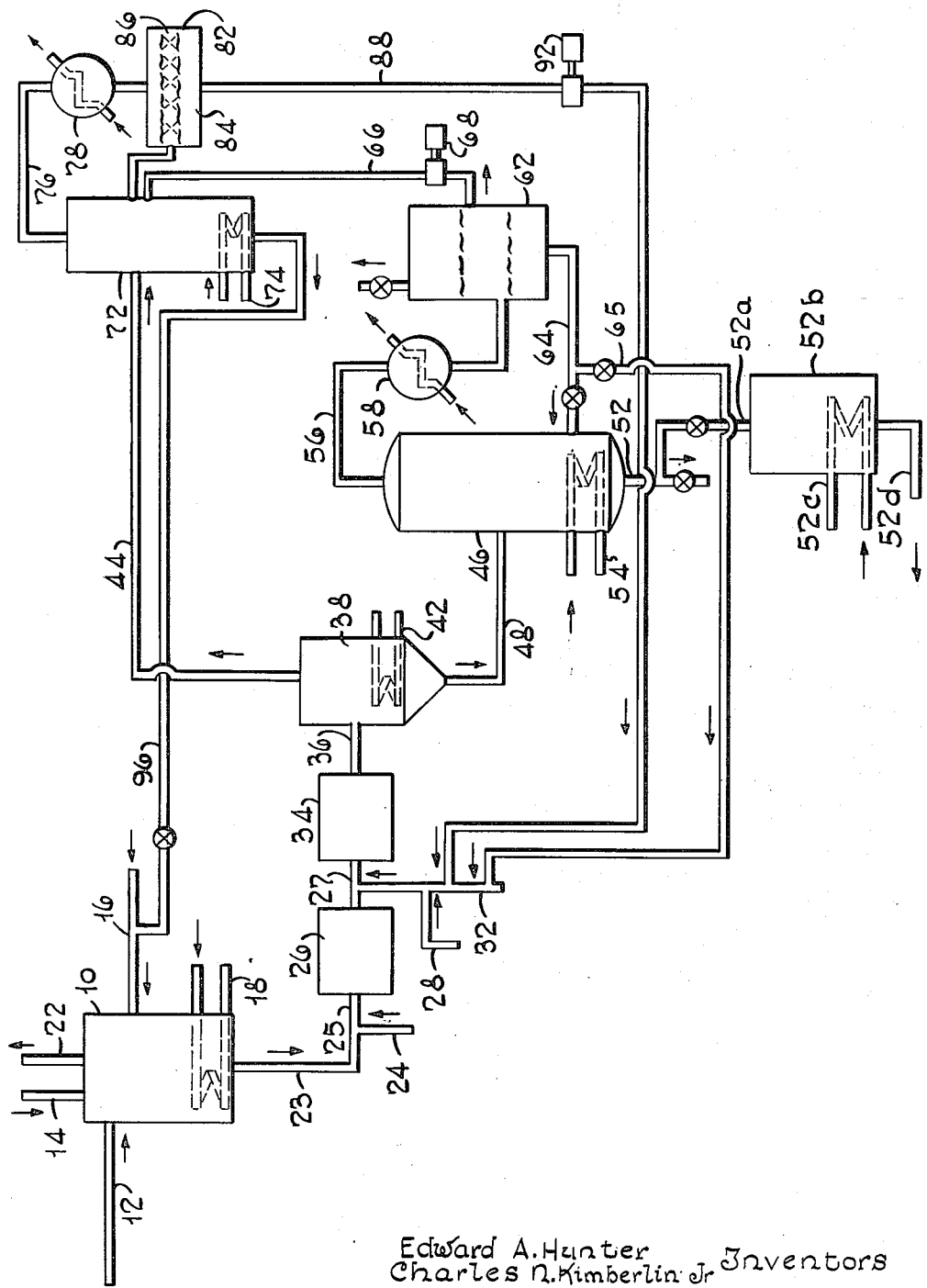
Edward A. Hunter
Charles N. Kimberlin Jr. Inventors
By George J. Silhavy Attorney

UNITED STATES PATENT OFFICE 2,656,321

METHOD FOR MAKING ALUMINA HYDROSOLS

Edward A. Hunter and Charles N. Kimberlin, Jr., Baton Rouge, La., assignors to Standard Oil Development Company, a corporation of Delaware Application March 6, 1951, Serial No. 214,158

9 Claims. (Cl. 252—313)

This invention relates to an improved method for making alumina sols.

While there are suggestions in the prior art of methods of making alumina sols or hydrosols, there are no entirely satisfactory commercial processes for making alumina sols or hydrosols on a large scale. One process generally referred to is the Patrick process wherein aluminum metal is reacted with acetic acid but the process is expensive because reaction proceeds very slowly. This process has been improved considerably by conducting the reaction in the presence of an oxidizing gas, but even with this improvement the reaction proceeds more slowly than desired.

According to the present invention, aluminum metal is dissolved in a water insoluble alcohol such as amyl alcohol or a higher aliphatic alcohol or a mixture of such alcohols. Instead of using the alcohol alone it is preferred to use a mixture of alcohol and a hydrocarbon or a hydrocarbon oil. The reason for using a water insoluble alcohol or alcohol-oil mixture is that the alcohol or alcohol-hydrocarbon mixture can be easily recovered and re-used to make an economical process. While the water insoluble alcohols are preferred, water soluble alcohols may be used in which event the recovery of the alcohol involves a more expensive distillation step. It has been heretofore known to hydrolyze an aluminum alcoholate made from a water insoluble alcohol but such hydrolysis results in a slurry of alumina in water.

According to the present invention an alumina sol or hydrosol is produced from a solution of aluminum alcoholate dissolved in excess alcohol or alcohol-hydrocarbon mixture by mixing therewith a peptizing agent such as an organic acid to obtain a substantially anhydrous homogeneous solution containing aluminum alcoholate and said peptizing agent and contacting said solution with water to hydrolyze the aluminum alcoholate, and regenerate the alcohol leaving an alumina hydrosol as an aqueous phase. The alcohol is recovered and used in another reaction step for making more aluminum alcoholate. The alumina hydrosol is preferably digested or aged to improve its characteristics. The alumina sol or hydrosol produced is a stable one and may be used as such to form alumina gels or may be mixed with silica sols or various other forms of catalytic materials to make conversion catalysts having any desired content of alumina.

In the drawing:

The figure represents one form of apparatus for carrying out the process of the invention.

Referring now to the drawing the reference character 10 designates a reactor into which aluminum metal in the form of chips, turnings or the like is introduced through line 12. A catalyst such as mercury salts, mercury, iodine and aluminum halide or the like with mercuric chloride being preferred is introduced into vessel 10 through line 14. The alcohol or alcohol-hydrocarbon mixture is introduced into vessel 10 through line 16. The alcohol is an aliphatic alcohol which is preferably insoluble in water or substantially insoluble in water such as amyl alcohol or higher alcohols or mixtures of such insoluble alcohols. The alcohols employed in the process must be essentially anhydrous. The aliphatic alcohols having 5 or more carbon atoms per molecule are especially useful in the present invention and the higher aliphatic alcohols are suitable provided they are insoluble in water and are liquid at the temperature of operation of the process.

While the water insoluble alcohol or mixtures thereof with other alcohols may alone be used to produce aluminum alcoholates according to this process, it is preferred to add to the alcohol a hydrocarbon such as heptane, octane, benzene, toluene, xylene, methylcyclohexene, or mixtures such as a petroleum distillate boiling within the range of 180° to 500° F. It is preferred to use a petroleum distillate of relatively narrow boiling range which boiling range includes the boiling range of the alcohol employed; for example, for use with amyl alcohols a petroleum distillate boiling in the range of 220° to 290° F. is satisfactory.

The addition of the hydrocarbon facilitates the separation of the alcohol from the water. In addition the hydrocarbon diluent aids in controlling the temperature during the reaction and also serves as a solvent for the aluminum alcoholate formed. The mixture preferably contains about 50% of the alcohol and about 50% of the hydrocarbon by volume but the hydrocarbon may range from 0% to 90% of the total volume.

To initiate the reaction, heat is supplied to vessel 10 by a steam coil 18 or other heating means to heat the contents of vessel 10 to about 180° to 300° F. During the reaction hydrogen is given off and this is vented through line 22 and may be recovered because it is pure hydrogen. After the reaction is well started it proceeds at a fast rate and generally cooling will be necessary. The cooling may be done by passing a cooling medium through the coil 18 or other methods of cooling may be used. In a batch-wise type of operation the reaction is continued until the aluminum has gone into solution or for about 30 to 60 minutes.

The reaction may also be carried out in a continuous manner in which it is preferred to maintain at all times a large excess of aluminum metal in reactor 10 and to introduce catalyst through line 14 and alcohol or alcohol-hydrocarbon mixture through line 16 and to withdraw aluminum alcoholate solution through line 23 at a rate which will provide sufficient residence time for the alcohol in reactor 10 for converting the alcohol to aluminum alcoholate to a desirable degree, an average residence time of about 30 to 60 minutes is desirable. Although reactor 10 may be maintained at substantially atmospheric pressure, it may be desirable to maintain reactor 10 under superatmospheric pressure such as 5 to 100 lbs. per sq. in. gauge, preferably about 25 lbs. per sq. in. gauge, in order to increase the boiling temperature of the reaction mixture. The reaction of the aluminum with the alcohol is carried out at a temperature of about 180° to 300° F., preferably about 240° to 270° F.

The reaction products comprising a solution of aluminum alcoholate in hydrocarbon and excess alcohol are withdrawn from tank 10 through line 23 and mixed with a small amount of an organic acid or other peptizing agent such as acetic acid, preferably glacial acetic acid, added through line 24.

Usually about 1 part of acetic acid to 3 parts of alumina by weight (calculated as $Al_2O_3$) contained in the alcoholate solution are used, but the ratio may vary between 1 of acetic acid to 10 of alumina, and 2 of acetic acid to 1 of alumina. The introduction of glacial or anhydrous acetic acid through line 24 provides a substantially anhydrous, homogeneous solution of aluminum alcoholate and acetic acid in excess alcohol and hydrocarbon, which solution upon hydrolysis with water, presently to be described, will produce an aqueous phase comprising an alumina sol or hydrosol. All the acetic acid or any desired fraction thereof may be added at once through line 24; alternatively, a part of the acetic acid may be added with water in the hydrolysis step presently to be described. However, it is preferred to add at least one-half of the acetic acid through line 24. For that portion of the acetic acid added with the hydrolysis water the glacial acetic acid has no advantage over the other grades available. While acetic acid is the preferred peptizing agent, other peptizing agents such as formic acid, propionic acid, glycolic acid, lactic acid, tartaric acid, hydrogen chloride, hydrogen bromide, aluminum chloride, aluminum bromide and the like may be used.

After the addition of the acetic acid from line 24, the mixture is passed through line 25 and an orifice mixer 26, where the alcoholate and acid are mixed. The solution of aluminum alcoholate containing acetic acid leaving mixing zone 26 by line 27 is admixed with water introduced by line 32. If desired, a further amount of the acetic acid is introduced with the water by line 28. The resulting mixture is passed through an orifice mixer 34 which functions as a hydrolysis and peptizing zone where the mixture is vigorously agitated. The amount of water may vary between about 1 to 99 parts by weight of alumina to water and 6 to 94 parts by weight of alumina to water. Instead of using orifice mixers 26 and 34, other forms of mixing means may be used to obtain the desired agitation. In mixer 34 the alcoholate is hydrolyzed to regenerate the alcohol and to form an aqueous phase comprising alumina hydrosol. The temperature in the hydrolysis zone 34 may be within the range of 60° to 220° F., preferably about 150° to 200° F.

From the second mixer 34 the mixture is passed through line 36 to a settling zone 38, which may be provided with a steam heat coil 42 or other heating means to heat the contents of zone 38, if desired, to about 70° to 210° F., preferably 150° to 200° F. The mixture may be maintained in zone 38 at a temperature between about 150° and 200° F. for 30 minutes to 5 hours to provide an aging or digesting period for the alumina sol. In settling zone 38 the aqueous and organic phases separate with the organic phase forming the top layer which is conducted overhead through line 44 to a dewatering or distillation tower 72 later to be described.

The lower layer comprising acetic acid stabilized alumina hydrosol and residual organic solvents is withdrawn from the lower portion of settling zone 38 through line 48 and passed to the distillation tower 46. In distillation tower 46 the aqueous phase comprising a stable alumina hydrosol is stripped of residual alcohol and hydrocarbons. The alumina hydrosol contains about 1% to 8% by weight alumina and about 0.1% to 10% by weight of acetic acid. The stable alumina hydrosol is withdrawn from the bottom of tower 46 through line 52 and may be stored as such or may be used for the preparation of alumina gel particles in any desired form or shape or it may be mixed with silica hydrosols or hydrogels to make hydrocarbon conversion catalysts ranging from 1 to 99% by weight of alumina with the rest being silica. If desired, alumina hydrosol from line 52 may be introduced by line 52a into aging tank 52b provided with heating means 52c where the alumina hydrosol may be aged for ½ to 10 hours at a temperature of 150° to 212° F. Aged hydrosol is withdrawn from aging tank 52b by line 52d and may be stored as such or used for the preparation of alumina gel particles or catalysts.

Heat is supplied to the tower 46 by steam heating coil 54 or other suitable heating means to heat the contents thereof to about 212° F. In the distillation tower 46 the residual water insoluble alcohol-hydrocarbon mixture, some water and some acetic acid are separated and passed overhead through line 56 having a condenser 58. The condensed material is passed to separator 62 to separate a lower water layer containing a small amount of acetic acid from a water insoluble upper layer containing the alcohol hydrocarbon mixture. The water layer is withdrawn from the bottom of separator 62 through line 64 and returned either to distillation tower 46 or returned to line 32 through line 65 to the hydrolysis step.

The upper water insoluble layer is withdrawn through line 66 and passed by pump 68 to a dewatering or drying tower 72 provided with a steam heating coil 74 or other heating means. The drying still is heated to about 180° to 300° F. to separate water from the water insoluble alcohol-hydrocarbon mixture. Water vapor containing some alcohol and hydrocarbon with it passes overhead through line 76 provided with a condenser 78 for condensing the vapors and the condensate is passed into settling and separating tank 82 where gravity separation takes place to form a bottom water layer 84 and a top alcohol-hydrocarbon layer 86. The water is withdrawn from the water layer and passed through line 88 by pump 92 into line 32 for reuse in the hydrolysis step. In this way any alcohol and/or hydrocarbon mixed with the water is returned to the system and not lost. The alcohol-hydrocarbon layer is withdrawn through line 94 and returned to the drying still 72 for further drying.

The alcohol-hydrocarbon mixture which has been substantially completely freed of any dissolved or entrained water is withdrawn from the bottom of drying still 72 through line 96 for return to line 16 and vessel 10 for reuse in the process.

The following examples are given merely as illustrative of the invention and the scope of the invention is not to be restricted thereto as changes and modifications may be made without departing from the spirit of the invention.

*Example I*

About 864 gm. of aluminum turnings were dissolved in about 32 liters of a 50–50% by volume mixture of an anhydrous $C_5$ alcohol mixture and a hydrocarbon oil and containing about 6 grains $HgCl_2$. The $C_5$ alcohol mixture contained isomeric amyl alcohols so that the alcoholate formed was amyl alcoholate. The hydrocarbon oil was a distillate having a boiling range of about 200° to 400° F. The reaction was carried out at a temperature of about 270° F. until all the aluminum metal was dissolved and 1 cc. of the solution was equivalent to about 0.05 gm. alumina.

About 10 cc. of glacial acetic acid was then mixed with agitation to about 600 cc. of the alcoholate solution. The agitation was done by a propeller type agitator in a beaker. The ratio of acetic acid to alumina was about 1 to 3 by weight. The mixture was then added rapidly with the same type of agitation to 1000 cc. of 1% acetic acid at about 180° F. and the agitation was continued for about 5 minutes after which the agitation was stopped and the mixture settled until a major portion of the alcohol-hydrocarbon mixture separated as an upper layer. The upper layer of alcohol-hydrocarbon mixture was decanted. The remaining lower aqueous layer was digested with slow boiling for about 30 minutes at about 212° F. and yielded a translucent stable alumina hydrosol containing about 3% alumina and about 2% acetic acid.

*Example II*

About 864 gm. of aluminum turnings plus about 0.5 gm. $HgCl_2$ were dissolved in about 32 liters of a 50–50% by volume mixture of a hydrocarbon fraction and anhydrous Pentasol. The Pentasol was a mixture of isomeric $C_5$ aliphatic alcohols. The hydrocarbon fraction was a distillate having a boiling range of about 200° to 400° F. The resulting amyl alcoholate solution was hydrolyzed with a solution of about 520 cc. of glacial acetic acid in about 55 liters of water (about 1% acetic acid by weight) at 175° F. The hydrolysis was carried out by pumping the two solutions in controlled ratio of about 55 parts by volume of acetic acid solution to 32 parts by volume of the alcoholate solution, the two components being discharged simultaneously on the impeller of a centrifugal pump to produce rapid mixing. The mixture was discharged to a large separatory funnel where it rapidly broke to an upper organic liquid layer and a lower aqueous layer comprising a milky alumina hydrosol.

The alumina hydrosol was then charged to a still pot and refluxed under a still-head which returns the aqueous overhead to the pot, while the organic overhead was removed and added to the alcohol-hydrocarbon fraction previously recovered to be recycled to the aluminum alcoholate preparation step. During this treatment the temperature was maintained at about 212° F. for about 30 minutes. The still bottoms comprised an alumina hydrosol of excellent translucent appearance with no evidence of sediment or settling.

*Example III*

About 27 grams of alumina turnings plus about 0.1 gram of mercuric chloride plus about 0.1 gram of iodine were dissolved in 600 cc. of anhydrous isopropyl alcohol. The mixture was heated under reflux to initiate the reaction, but after the reaction was well started it was necessary to provide cooling and finally the mixture was again heated under reflux to complete the reaction. About 1½ hours were required to complete the reaction between the aluminum and the isopropyl alcohol. After completion of the reaction about 5 cc. of glacial acetic acid was added to the solution of aluminum isopropylate in excess isopropyl alcohol and immediately thereafter the solution was added with vigorous agitation to 2000 cc. of water which had been heated to 150° F. There was formed an alumina sol. The isopropyl alcohol was distilled overhead from the alumina sol leaving a bottoms comprising an alumina hydrosol of about 3% concentration. The recovered isopropyl alcohol may be dehydrated for reuse in converting more aluminum metal to aluminum isopropylate.

When producing a silica-alumina catalyst containing from 10% to 90% by weight of alumina with the rest being silica by selecting the proper proportions of the alumina hydrosol prepared as above described and a pure silica hydrosol prepared from a dilute solution of sodium silicate by passing the sodium silicate solution over an acid regenerated cation exchange bed of material such as a resin it is also preferred to age or digest the silica hydrosol so produced.

The silica hydrosol may be prepared by contacting a dilute solution of sodium silicate for example the $Na_2O \cdot 3.25SiO_2$ with the solution containing about 20 to 50 gm. $SiO_2$ per liter, over an acid regenerated cation exchange resin to produce a silica hydrosol containing about 3% by weight of silica but the range of silica may range from about 2 to 5% by weight. The pH of the silica hydrosol is within the range of 2 to 8. Before mixing the silica hydrosol with the aged alumina hydrosol above described, it is desirable also to age or digest the silica hydrosol so that its time of setting is decreased and also the silica hydrosol is more highly polymerized before the hydrosols are mixed. For this purpose the silica hydrosol is passed to a digesting or aging zone provided with heating means for heating the silica hydrosol to a temperature of about 150° to 200° F. and maintaining the silica hydrosol at this temperature for about 30 minutes to 5 hours. The aged silica hydrosol at a temperature of about 70° to 200° F. is then thoroughly mixed with the desired amount of alumina hydrosol at a temperature of about 70° to 200° F. to produce silica alumina gel particles in the desired form and the gel is then dried. By spray drying the mixed hydrosols or passing them as droplets into a heated oil bath, microspherical gel catalysts are obtained.

What is claimed is:

1. A method for preparing alumina hydrosols from anhydrous aluminum alcoholates which comprises first adding substantially anhydrous acetic acid to the anhydrous alcoholate, then adding water to hydrolyze the alcoholate while agitating at a temperature between about 60° and 220° F. and separating a stable alumina hydrosol from the mixture.

2. A method for preparing alumina hydrosols which comprises mixing anhydrous aluminum alcoholate with an anhydrous peptizing agent selected from the group which consists of acetic acid, formic acid, propionic acid, glycolic acid, lactic acid, tartaric acid, hydrogen chloride, hydrogen bromide, aluminum chloride and aluminum bromide; adding water to the resulting mixture to hydrolyze the alcoholate and regenerate the alcohol at a temperature between about 60° and 220° F. and separating alumina hydrosol from the mixture.

3. A method for the preparation of alumina hydrosol which comprises mixing an anhydrous aluminum alcoholate derived from an alcohol having 2 to 10 carbon atoms per molecule with glacial acetic acid, then adding an additional amount of glacial acetic acid and water to the first-mentioned mixture and agitating to hydrolyze the alcoholate and peptize the alumina, digesting the peptized and hydrolyzed mixture for an extended period of time at an elevated temperature, and then separating a stable alumina hydrosol from the digested mixture.

4. A method according to claim 3 wherein the amount of acetic acid used is within the range of about 1 part by weight of acid to 10 parts by weight of alumina and 2 parts of acid by weight to 1 part by weight of alumina, and wherein the amount of water used is within the range of about 1 part of alumina by weight to 99 parts of water by weight and 6 parts of alumina by weight to 94 parts of water by weight.

5. A method according to claim 3 wherein the digestion temperature is within the range of 150° to 200° F. and the period of time is about 30 minutes to 5 hours.

6. A method according to claim 3 wherein the alcohol is a water insoluble alcohol and is removed by a distillation step leaving the alumina hydrosol.

7. A method of preparing alumina hydrosols which comprises adding first a substantially anhydrous acetic acid as a peptizing agent and later an aqueous hydrolyzing agent to an anhydrous aluminum alcoholate; heating to a temperature within the range of about 150° to 200° F. while hydrolyzing, agitating the mixture to obtain intimate contact between the acid and the aluminum alcoholate and between the water and the aluminum alcoholate to hydrolyze the aluminum alcoholate; heating the resulting mixture and separating a stable alumina hydrosol from the mixture.

8. A method of preparing alumina hydrosols which comprises adding a substantially anhydrous acetic acid as a peptizing agent to an anhydrous aluminum alcoholate, hydrolyzing the aluminum alcoholate at a temperature between 60° and 220° F. to form peptized hydrous alumina, heating the resulting mixture and separating a stable alumina hydrosol from the mixture.

9. A method of preparing alumina sol which comprises adding an anhydrous acetic acid as a peptizing agent to an aluminum alcoholate of a substantially water insoluble aliphatic alcohol before contacting with water and thereafter hydrolyzing the aluminum alcoholate by mixing with water containing a peptizing agent at a temperature between about 60° and 220° F. and recovering an alumina sol.

EDWARD A. HUNTER.
CHARLES N. KIMBERLIN, JR.

References Cited in the file of this patent

UNITED STATES PATENTS

| Number | Name | Date |
| --- | --- | --- |
| 2,085,129 | Stoewener | June 29, 1937 |
| 2,337,421 | Spence et al. | Dec. 21, 1943 |

FOREIGN PATENTS

| Number | Country | Date |
| --- | --- | --- |
| 618,313 | Great Britain | Feb. 18, 1949 |